Figure 3:
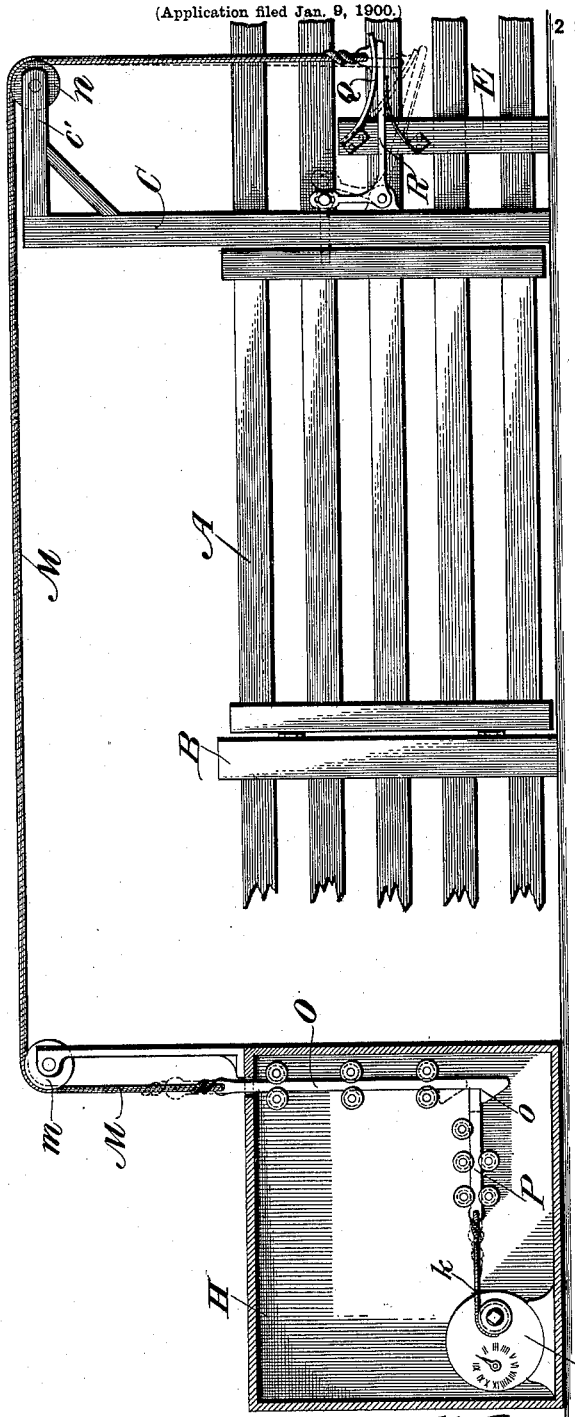

No. 656,812. Patented Aug. 28, 1900.
W. G. COCKERILL.
APPLIANCE FOR AUTOMATICALLY ACTUATING FARM GATES AT PREDETERMINED INTERVALS.
(Application filed Jan. 9, 1900.)
(No Model.) 2 Sheets—Sheet 1.
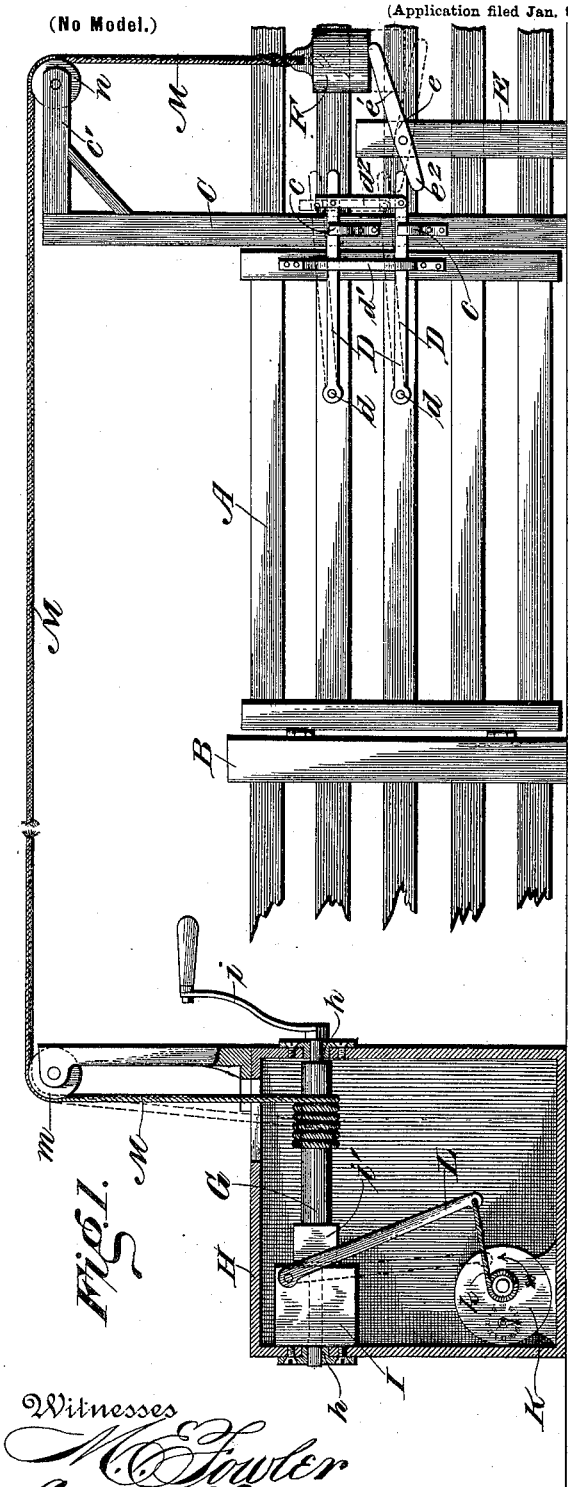
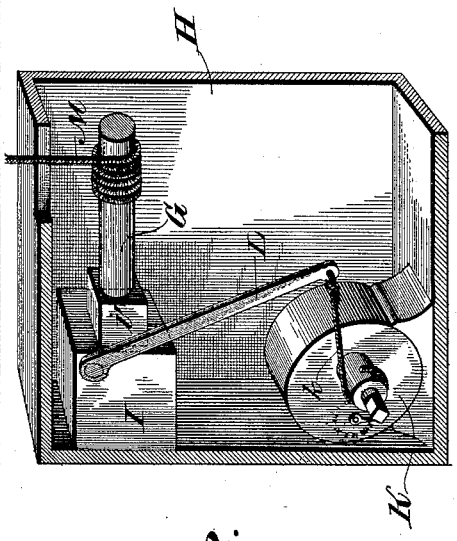

No. 656,812. Patented Aug. 28, 1900.
W. G. COCKERILL.
APPLIANCE FOR AUTOMATICALLY ACTUATING FARM GATES AT PREDETERMINED INTERVALS.
(Application filed Jan. 9, 1900.)
(No Model.) 2 Sheets—Sheet 2.

Witnesses
M. C. Fowler
Osgood B. Dowell

Inventor
Walter G. Cockerill
By Julius C. Dowell
Attorney

UNITED STATES PATENT OFFICE.

WALTER G. COCKERILL, OF GREENFIELD, OHIO.

APPLIANCE FOR AUTOMATICALLY ACTUATING FARM-GATES AT PREDETERMINED INTERVALS.

SPECIFICATION forming part of Letters Patent No. 656,812, dated August 28, 1900.

Application filed January 9, 1900. Serial No. 852. (No model.)

*To all whom it may concern:*

Be it known that I, WALTER G. COCKERILL, a citizen of the United States, residing at Greenfield, in the county of Highland and State of Ohio, have invented certain new and useful Improvements in Appliances for Automatically Actuating Farm-Gates at Predetermined Intervals; and I do hereby declare the following to be a full, clear, and exact description of the invention, such as will enable others skilled in the art to which it appertains to make and use the same.

This invention relates to appliances for automatically actuating farm-gates and the like for the purpose of opening or closing the same, so as to permit cattle or other animals to pass from one inclosure to another when changing pasture or for feeding or housing without requiring the attendance of a farm-hand or other person to effect the change or passage of the animals into or out of the desired inclosure at a predetermined time.

The primary object of my invention is to provide a simple and inexpensive contrivance of the character referred to, by means of which a herd of cattle, sheep, or horses may be afforded an entrance from one pasture into another or from one feed-lot or section of a feed-lot into another section or from a pasture into a building, or vice versa, at any desired period of time without rendering it necessary for an attendant to open the gate controlling the entrance to or from the inclosure.

A further object is to effect a saving in both time and labor in attending to the wants of various domestic animals, and particularly cattle, sheep, and horses on cattle-ranches of large area, such as are employed in the western portions of the United States.

The invention will first be hereinafter more particularly described with reference to the accompanying drawings, which form a part of this specification, and then pointed out in the claims at the end of the description.

In the accompanying drawings, in which similar letters of reference are used to denote corresponding parts in the different views, Figure 1 represents in front elevation an ordinary farm-gate operatively connected with an automatically-actuated unlatching appliance embodying my invention, the housing for the actuating mechanism being shown in vertical section. Fig. 2 is a detail view in perspective of the actuating mechanism for automatically unlatching the gate, the near portion of the case or housing for the same being broken away or removed; and Fig. 3 is a front elevation of a modification of the invention, the housing being shown in section.

In the drawings the letter A may denote a gate hinged to the post B and provided with a suitable device for retaining it in a fixed position—that is, either open or closed—such as a latch or latches D, by which it is engaged with the post C. Two latch-bars D are shown adapted to swing vertically on their pivots $d$ and held in place on the gate by a suitable cleat $d'$, in position to adapt the latches to engage keepers $c$, fixed to the latch-post C. To cause said latches to swing in unison, they are pivotally connected to a vertical connecting-strip $d^2$. At one side of the post C is a short vertical post E, near the upper end of which is horizontally pivoted a rocking lever $e$, the longer arm $e'$ of which lies in the path of a vertically-movable weight F and the shorter arm $e^2$ of which is arranged to engage and lift the lower latch-bar D when the longer arm $e'$ of said lever is depressed, thus unlatching the gate to permit it to swing open.

The letter G may denote a pulley or windlass suitably journaled, as at $h\ h$, in the sides of a suitable housing H, through which it passes, and having, preferably, an elongated trunnion or reduced end portion extending through a block I on the inside of the housing, one end of the windlass outside of the housing being provided with an operating handle or crank $i$. Adjacent to the block I on the axis of the rotary element G is a polygonal or square-sided portion, as at $i'$, for a purpose to be presently explained. A suitable time device K, such as an ordinary clock-movement, is located, preferably, in the housing below the block I, and to the alarm or winding-shaft thereof is attached a flexible cord or chain $k$, connecting it with the pendent end of a swinging lever L, which is pivoted at its opposite end to the block I and adapted to engage one of the flat faces of the polygonal portion $i'$ of the pulley-shaft or windlass. From the latter and adapted to be wound upon or unwound therefrom a flexible cord or chain M extends over a pulley $m$, journaled in a vertical support rising from the housing H, thence over a pulley $n$, which may be journaled at the outer end of a horizontal arm $c'$, projecting from an upward extension of the latch-post C, and thence down to the weight F, which is thereby suspended in position to depress, when lowered, the long arm $e'$ of the lever $e$, and thus release the latch or latches which lock the gate in a closed position.

The operation of the invention is as follows: Supposing the gate to be closed controlling the entrance to a feed-lot where stock are to be fed and assuming the parts to be in the position shown in full lines in Fig. 1, with the clock mechanism wound and set to operate at a predetermined period of time, when such period is reached the winding-shaft of the time device will turn, as indicated by the arrow in Fig. 1, thus winding the cord upon the pulley-shaft or windlass and drawing with it the lever L until the latter passes the flat-surfaced or squared portion of the windlass, whereupon the latter will be released, permitting the rope to unwind therefrom by the pull and descent of the weight at the opposite end of said rope, thus depressing the longer arm of the lever $e$ and lifting the latch or latches out of the keeper, thereby unlocking the gate, as indicated by the dotted lines in Fig. 1. The gate being adapted by any of the common methods to automatically open when unlatched may now freely swing outward or inward to admit the cattle to the feed-lot, or vice versa. To return the parts to their normal position, it is simply necessary first to wind the time device, then turn the windlass by means of the crank, so as to wind up the rope or cord and elevate the weight at the opposite end of the latter, and then to draw the swinging lever to the right until it engages with one of the flat surfaces of the windlass, whereby the appliance is "set" for releasing the latch on the gate or door at a predetermined time, the time device being set to actuate the swinging lever at a given time. The gate should now be closed and the rocking latch-releasing lever adjusted to a position to again be automatically operated for releasing the latch at the expiration of the time at which the alarm is set.

As illustrated in the drawings, the automatic mechanism for unlatching the gate is arranged in close proximity thereto and may be permanently so situated; but it may be located at any desired distance from the gate or at any point that may be most convenient for "setting" the mechanism to open the gate and without in any way retarding the operation of said unlatching mechanism. Furthermore, the device for retracting the lever to release the windlass may be of any desired construction and may have incorporated therewith a suitable gong for sounding an alarm when the gate is unlatched by the operation of the releasing mechanism, so as to notify the farmer or owner of the cattle-range that the gate has been opened or closed, accordingly as the mechanism is used for opening or closing the entrance to a feed-lot or other inclosure; but a gong is not necessary to the practical working of the invention. It will also be noted with reference to the drawings that the mechanism for unlatching the gate does not interfere with the free manipulation of the latch by hand when it is necessary to replenish the feed in the feed-lot or for any other purpose desired.

The invention will be found to be especially useful to cattle-raisers and on large farms where it is customary to employ a feed-lot divided into two or more sections separated by fences, with gates for affording entrance from one section to another. The feed-troughs in such lot or lots may be filled with fodder or other feed at any convenient hour of the day, and the cattle or stock confined in or allowed to enter one lot may remain therein until feed-time again arrives—late in the afternoon, for instance—when the automatically-actuating mechanism controlling the gate to an adjacent lot or division of the feed-lot will operate to open the gate and permit the stock to enter said lot for feeding. A busy farmer with such a feed-lot having a suitably-equipped gate or gates may haul out feed enough in the morning to fill the feed-troughs of one or more divisions of a lot, and in the evening it will not be necessary for him to quit work for the purpose of hauling out additional feed or to travel half a mile or more to open a gate for the purpose of feeding his stock.

It will be understood, of course, that the clock mechanism illustrated is only one form of device that may be employed for accomplishing the desired result, as other means may be employed, such as an hour-glass or a bucket of dripping water or an electric device suitably arranged to release the latch or weight-supporting cord and permit the weight to descend and release the latch or other locking device to permit the gate to open.

The gate may be eccentrically hinged to adapt it to swing open when the latch is released, or a weight or spring may be employed for opening it. Such contrivances being well known in the art, a specific description thereof is deemed unnecessary. While I preferably employ a rocking lever between the weight and latch or other locking device for keeping the gate closed, in order that a comparatively-small weight may exert sufficient force to raise or release the latch, such lever might be dispensed with, and the gravity-weight or a spring may be made to act directly on the latch for releasing the same. The swinging lever for holding the windlass or other rotary element against rotation might also be differently arranged, and any suitable device for holding the windlass or rotary element against rotation may be employed, and various changes may be made in the details of construction without departing from the spirit and scope of my invention, and hence I do not desire to be limited to the exact construction and arrangement of parts described and shown.

In the modification shown in Fig. 3 of the drawings, instead of a windlass and rope with attached weight for releasing the fastening or retaining device, by which the gate is kept normally in a fixed position, I have shown a vertically-movable bar O suitably housed and having one end thereof connected with the rope M and its other end formed or provided with a projection or shoulder o, which is engaged by a sliding bar or catch P, which is adapted to retain the latch-releasing weight or device (in this instance a spring Q) in position to actuate the latch and release the gate when the movable bar O is released by the clockwork or other means for withdrawing the catch P at a predetermined interval from engagement with said bar. The spring Q, as shown, may be fixed at one end to the fence or upright E, with its free end in position to depress the long arm of the angle-lever R, and thus release the bolt or other retaining device from engagement with the gate to permit the latter to swing open, said angle-lever being normally held in position for engagement of the retaining device or latch with the gate when the actuating and latch-releasing mechanisms are in their normal positions. To facilitate the movement of the vertically-movable bar and catch P engaging therewith, they may be arranged to slide between antifriction-rollers, as shown, or in any suitable manner, said actuating mechanism being preferably inclosed in a suitable housing and located at some convenient point, usually some distance from the gate, where the farmer or occupant of an adjacent dwelling may ascertain whether or not the gate has been released by observing whether the vertically-movable bar has ascended to the position indicated in dotted lines, in which position the force of the spring Q will have depressed the long arm of the angle-lever R, thus withdrawing the bolt or catch having pivotal connection with the short arm of said lever, as shown in the drawings.

Having thus fully described my invention, what I claim, and desire to secure by Letters Patent of the United States, is—

1. In combination with a farm-gate provided with a latching device for keeping the gate normally in a fixed position, a releasing device arranged in position to engage said latching device, a locking device located at a distance from said releasing device and flexibly connected therewith for sustaining it normally in an inactive position, and mechanism for automatically unlocking or releasing said locking device at a predetermined period of time and paying out said flexible connection under the stress of said releasing device, whereby the gate is automatically unlocked at such predetermined period of time, substantially as described.

2. In combination with a suitably-hinged gate provided with a latching device for holding it normally in a closed position, a windlass located at a distance from said gate, a cord extending from the windlass and having a weight suspended from its free end adjacent to said latching device so as to disengage the latch when the weight descends, means for normally holding said windlass against rotation, and mechanism for automatically releasing said rotary element at a predetermined period of time; whereby when the windlass is released the weight will descend and unlatch the gate to permit the gate to be opened, substantially as described.

3. In combination with a farm-gate provided with a pivoted latch and a keeper for the same, a rocking lever arranged to lift said latch when the lever is rocked, a windlass having a suitable handle, a cord passing from said windlass over antifriction-rollers into close proximity to said gate and provided with a weight adapted to actuate said rocking lever and unlatch the gate when the weight descends, a pendent arm normally engaging said windlass to prevent rotation thereof, and mechanism for disengaging the arm from the windlass at a predetermined period of time, whereby the gate will be automatically unlatched at predetermined intervals, substantially as described.

4. An appliance for automatically unlatching a farm-gate or the like, comprising a latch for holding the gate closed, a rocking lever adapted to lift said latch when the lever is rocked, a windlass located at a distance from said gate having a polygonal stop-engaging surface, a pivoted arm or stop normally engaging said surface to prevent rotation of the windlass, mechanism adapted to move said stop at a predetermined interval of time and permit rotation of the windlass by the weight, and a cord extending from said windlass and carrying a weight suspended in proximity to said lever to rock the latter when the weight descends, substantially as described.

5. In combination with a suitably-hinged gate or the like, and a latching device for keeping it normally in a fixed position, mechanism for unlatching the gate, comprising a releasing device arranged in position to engage said latching device, a locking device located at a distance from said releasing device and flexibly connected therewith for sustaining it normally in an inactive position, and means for automatically unlocking or releasing said locking device at a predetermined period of time and paying out said flexible connection under the stress of said releasing device, whereby the gate may be automatically unlatched at such predetermined period of time.

In testimony whereof I affix my signature in presence of two witnesses.

WALTER G. COCKERILL.

Witnesses:
M. IRWIN DUNLAP,
WM. K. DUNLAP.